Aug. 7, 1951 H. W. LEVERENZ 2,563,472
TUBE AND SYSTEM FOR VIEWING INVISIBLE RADIATION
Filed Dec. 30, 1948

INVENTOR
HUMBOLDT W. LEVERENZ
BY
William A. Zalesak
ATTORNEY

Patented Aug. 7, 1951

2,563,472

UNITED STATES PATENT OFFICE 2,563,472

TUBE AND SYSTEM FOR VIEWING INVISIBLE RADIATIONS

Humboldt W. Leverenz, Princeton, N. J., assignor to Radio Corporation of America, a corporation of Delaware Application December 30, 1948, Serial No. 68,283

8 Claims. (Cl. 313—92)

My invention relates to methods and means for portraying intelligence, particularly to cathode ray tubes having targets formed from a solid material having inducible and eradicable absorption bands in the invisible regions of the electromagnetic spectrum. Such a material, which may or may not be a phosphor, is called a scotophor.

Visual images heretofore have been impressed upon cathode-ray tube screens, or upon screens used in other types of tubes, by scansion or irradiation with cathode rays, ultra-violet rays, X-rays, alpha particles, etc. The primary radiation may produce on the tube screen either visible bright luminescent traces on a dark background, or dark traces on a luminescent background, or dark tenebrescence traces on a bright reflecting background.

I propose to use screens of scotophor materials which under suitable excitation develop induced reversible absorption bands or lines in the invisible regions of the spectrum and to make such invisible absorptions visible with well-known devices sensitive to radiations in the invisible region of the spectrum which effectively transforms such invisible radiations into visible light.

If a screen is used, formed from a material having an inducible absorption band in the ultra-violet, for example, such a screen may be flooded with a fixed or variable intensity source of ultra-violet and viewed with an ultra-violet sensitive receiver which can transform ultra-violet light to visible light. In such an application, the screen material is excited by some means which will establish a pattern of absorption areas upon the screen corresponding to the intelligence that is desired to be viewed. Such an application need not be confined to the ultra-violet region of the spectrum but may also be used in other invisible or near-visible regions such as the infra-red region of the electromagnetic spectrum.

It is therefore an object of my invention to utilize invisible regions of the electromagnetic spectrum for image formation of intelligence.

It is another object of my invention to utilize a screen formed from material having inducible absorption bands in the invisible or near-visible regions of the electromagnetic spectrum for portraying intelligence.

It is also an object of my invention to utilize a screen formed of a material, which is excitable to induce absorption, in the material, of electromagnetic radiations in the invisible or near-visible regions of the spectrum.

The novel features which I believe to be characteristic of my invention are set forth with particularity in the appended claims, but the invention itself will best be understood by reference to the following description taken in connection with the accompanying drawing, in which:

Figure 3:
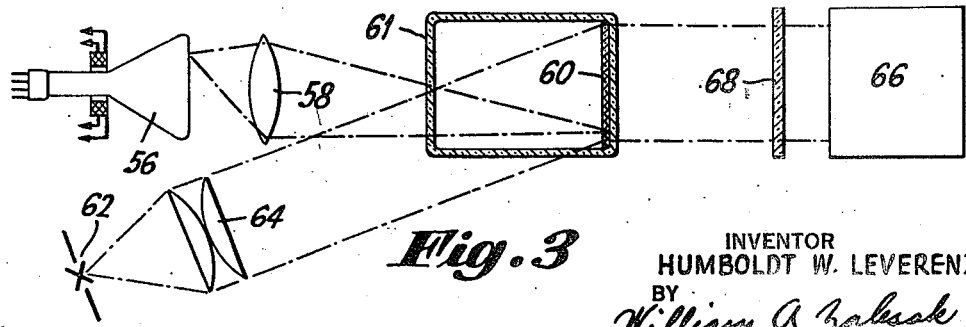

Figure 3 discloses alternate structures for portraying intelligence, according to my invention.

Figure 1:
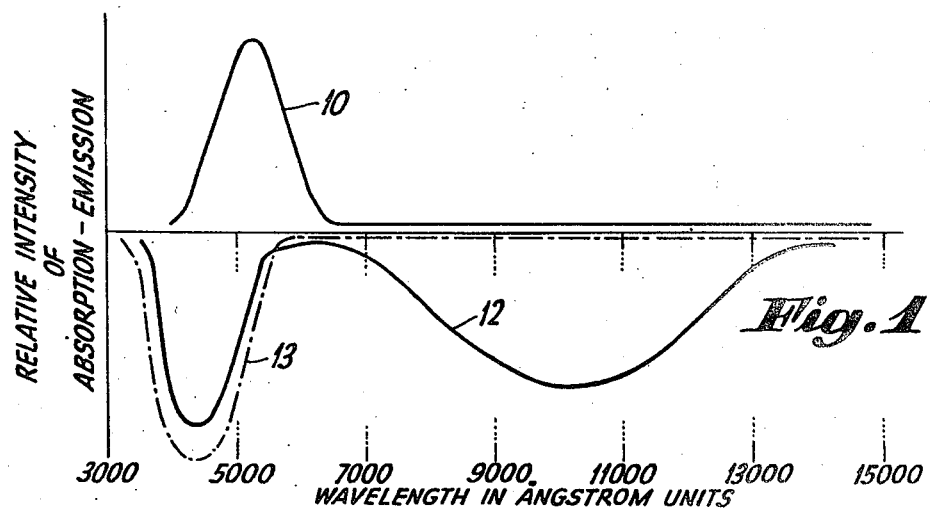
Figure 1 is a graphical representation of the absorption and emission characteristics of a screen material used according to my invention.

Figure 1 discloses, graphically, characteristic curves of the absorption and emission properties of a material which is excitable by blue light, or ultra-violet, or cathode rays to become an infra-red-absorbing scotophor, which is also an infra-red stimulable phosphor. This phosphor is strontium sulfo-selenide activated with Europium and Samarium and which may be represented by the formula SrS:SrSe:Eu:Sm. The preparation and characteristics of this material are fully disclosed in my co-pending application Serial Number 595,146, filed May 22, 1945, and issued on October 24, 1950, as Patent No. 2,527,365. The figure discloses, in curve 10, the relative rate of emission of radiant energy of the strontium sulfo-selenide phosphor material, when excited by irradiation with cathode rays, blue light, ultra-violet, etc. The peak emission, as shown in the drawing, is between 5000 and 5500 Angstrom units.

During such excitation of the material, there is induced in the material an absorption characteristic disclosed by the curve 12, in Figure 1. Curve 12 represents negative values representing increasing values of the relative rate of energy absorption by this material in the regions of the spectrum between 3000 and 15,000 Angstrom units. It is clear, from curve 12, that the excited material has a peak absorption level between 4000 and 5000 Angstroms and around 10,000 Angstroms, in the invisible region of the spectrum. It is this characteristic of certain excited phosphor materials, or, in general scotophor materials, to absorb light in the invisible region of the spectrum, which is utilized in detecting or portraying intelligence in the novel manner according to my invention. Curve 13, in Figure 1, represents in negative values, the relative rate of energy absorption by the strontium sulfo-selenide phosphor when in the unexcited state.

Figure 2:
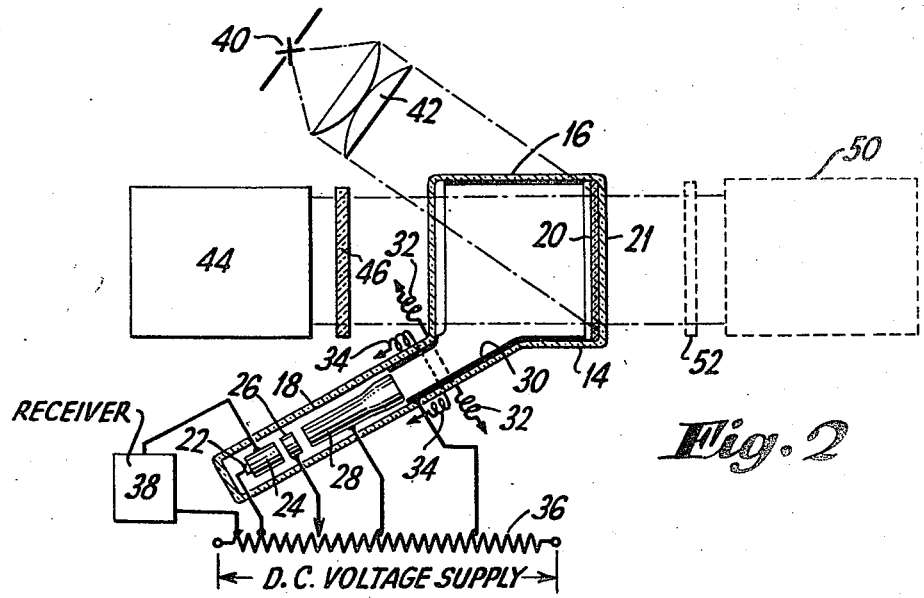
Figure 2 is a sectional view of cathode-ray tube and associated structures for portraying intelligence, according to my invention.

In Figure 2, there is disclosed a cathode-ray tube comprising an evacuated envelope 14 formed with a bulb portion 16 and a neck portion 18 extending at an angle to the axis of the bulb portion 16 as shown. Within the bulb portion 16 of the tube is applied a film of suitable scotophor material, such as a strontium sulfo-selenide phosphor having the formula and characteristics described above. The scotophor film 20 is put down upon a flat optically transparent portion 21 of the bulb 16. The opposite wall 23 of the bulb is also a flat portion and optically transparent to permit light to pass undistorted therethrough. Within the neck portion 18 of the cathode-ray tube, is a gun structure for forming and focusing a cathode ray beam upon the screen 20. The electron gun structure may be of a conventional design and, specifically, comprises an indirectly heated cathode cylinder 22 mounted within a beam-modulating grid cylinder 24. Spaced from the grid 24 along the axis of the envelope neck 18 is an accelerating apertured electrode 26 followed by a cylindrical first anode electrode 28. Electrodes 26 and 28 are maintained at positive potentials relative to that of the cathode during tube operation for forming the emission from the cathode 22 into an electron beam. A second anode electrode 30, adapted to be maintained, during tube operation, at a more positive potential than that of the first anode, is formed as a conductive coating upon a portion of the envelope neck 18 as is shown. The anode coating 30 is extended into the bulb portion 16 to maintain a uniform electrostatic field between the electron gun and the screen 20. Also, the anode coating 30 serves to collect the secondary emission from the target surface 20 during tube operation. The electrostatic fields, established during tube operation, between anodes 28 and 30, produce a final focussing effect upon the electron beam so that the beam will strike the target 20 in a small well-defined spot. The electron beam formed by the gun structure, shown in Figure 2, may be scanned over the surface of the target 20 by horizontal deflection coils 32 and vertical deflection coils 34. To provide the horizontal and vertical scansion, coils 32 and 34 are respectively connected to appropriate circuits generating saw-tooth voltages, as is well-known in the art.

The various electrodes of the gun are connected, as shown, to a D. C. voltage supply 36, to provide appropriate operating voltages to the several gun parts. The control grid 24 of the cathode-ray tube is connected through a signal receiver 38 to the voltage supply 36, to provide an operating potential more negative with respect to the potential of cathode 22 for maintaining an appropriate cut-off voltage for the electron beam. The receiver 38 may be of any type to vary the potential of control electrode 24 in accordance with received signal fluctuations. Variations in the control electrode potential will modulate the cathode-ray beam of the tube.

A source of radiation 40 provides an emission of infra-red radiation which is projected by a lens system 42 through the transparent bulb wall upon screen 20. The infra-red radiation from source 40, must fall within the absorption band of the excited material of screen 20. In the application shown in Figure 1, the infra-red light of source 40 is preferably around 10,000 Angstrom units, which is the peak absorption in the infra-red of the strontium sulfo-selenide phosphor material of screen 20. The portion of this infra-red light not absorbed by screen 20 is reflected back upon an energy transducer 44, which changes the infra-red light from screen 20 into visible light. The energy transducer 44 may be of any well-known type, as for example, a metascope, or an image device of the type shown in United States Patent 2,225,044, or a television pickup tube electrically tied to a television viewing tube. Whatever the form of the energy transducer 44 in this application, it need be sensitive to the infra-red light of the source 40.

In operation, the arrangement of Figure 2 is such that any desired signal voltages applied by the receiver 38 to the control grid 24 of the electron gun will appear as visible traces in the metascope 44. Signal voltages, applied to the control grid 24, will modulate the electron beam of the gun structure accordingly. The modulated electron beam is scanned by the fields of coils 32 and 34 respectively, in any given type of raster, over the surface of the target film 20. Wherever the electron beam strikes the target surface 20, there will be induced in the scotophor material of film 20 an absorption characteristic of the type indicated by the curve 12 of Figure 1.

The modulations of the electron beam will, in this manner, provide an infra-red absorption pattern over the surface of the target 20, corresponding to the signals applied to the control 24. The infra-red light projected upon this surface of the film 20 will be absorbed by the screen in a manner corresponding to this absorption pattern. Furthermore, light from the infra-red source 40 will be selectively reflected by portions of screen 20 which remain unexcited by the scanning electron beam of the tube and in accordance with the absorption characteristics of the non-excited phosphor, shown in curve 13 of Figure 1. This unabsorbed portion of light will be detected by the energy transducer 44, which is sensitive to the infra-red radiations around 10,000 Angstrom units from source 40. The energy transducer 44 will transform these radiations into visible light, so that an observer will see, as a dark trace upon a luminous screen a picture representing the signals applied by the receiver 38.

If desired, a light filter 46 may be placed between tube 16 and the energy transducer 44 to filter out the visible light emitted by the phosphor material 20 and represented by the curve 10 in Figure 1. However, a filter is not always necessary as some scotophor material, such as the alkali halides give a negligibly visible or no visible trace when scanned by a cathode ray.

If it is desired to transform the resulting dark trace images produced by the transducer 44 into bright trace images, the transducer 44 may be a television pickup tube whose output is put through an odd number of steps of amplification to form a positive video signal.

The above disclosure describes a strontium sulfo-selenide scotophor material for screen 20. However, the device shown in Figure 2 need not be confined to this material, as other luminescent or non-luminescent scotophors may be used giving the same or similar results. For example, a strontium-sulfide phosphor activated with cerium and samarium may be used with an infra-red light source and an infra-red energy transducer described above. Other suitable screen material may be lithium fluoride, which has an induced absorption band of 2500 Angstrom units, when excited by cathode rays or X-rays. Sodium fluoride has an inducible absorption band near 3400 Angstrom units and rubidium iodide has an inducible absorption band near 7750 Angstrom units. These scotophor materials can be used with the appropriate ultra-violet or infra-red irradiation, in which the irradiating light has wave-lengths near the cited peaks of the induced absorption bands. Likewise, the energy transducers should be chosen with sensitivities at the appropriate peaks of the absorption bands.

The screen 20 of Figure 1 has been disclosed as an opaque reflecting screen or brightly reflecting translucent screen. However, some scotophor materials will form sufficiently thin films which are transparent or of such translucency as to be highly transmitting to radiation. In such cases, the infra-red light from source 40 will pass through such a scotophor screen and may be detected by a transducer 50 in the same manner as that described for the transducer 44. Also, a filter 52 for the visible light may be placed between the transducer 50 and the tube envelope 14.

The absorption characteristic of the several scotophors suggested above can be induced by a cathode-ray beam ranging from a few hundred volts energy up to 100,000 volts and more of energy. However, for practical purposes, it is better to use a cathode-ray beam of around 10,000 to 50,000 volts energy. With low voltages of several hundred volts the cathode ray will penetrate only the surface layers of the scotophor so that the absorption characteristic is only poorly induced. A beam of higher energy will penetrate into the body of the scotophor to a greater extent and provide a better absorption characteristic. Within the range of voltages given, the beam can penetrate the crystals of the scotophor material so as to produce the required absorption characteristic. The induced absorption characteristic of an excited scotophor will remain for any desired length of time varying from a period of time within the order of one second to that of several hours, depending on the material, the temperature, and other operating conditions. The absorption characteristic of a scotophor screen also depends, not only on the quantum energy of the primary exciting radiation, but also on the intensity of the secondary electromagnetic radiation absorbed by the excited scotophor material. For example, at low intensities of the infra-red source 40 of Figure 1, the absorption characteristic of the scotophor will remain for long periods of time around several hours as mentioned above. As the intensity of the source 40 is increased, however, the absorption characteristic induced in the scotophor 20 will remain for shorter periods of time. Also, the absorption pattern put down upon the target 20 can be erased very quickly by either increasing the intensity of light source 40 to a large amount or by using auxiliary heating means adjacent the film 20. Also, another means for removing the induced absorption characteristic of the scotophor screen 20 would be to use a second intense cathode-ray beam, which because of its heating effect upon striking the target 20, would erase the induced absorption characteristic of the scotophor screen which it strikes. (This may be accomplished, also, by greatly increasing the current density of the primary exciting cathode-ray beam, thereby heating the scotophor to eradicate previously induced absorption patterns.)

In the application of Figure 2, other means, than the electron gun, may be used to excite the phosphor material 20. For example, the electron gun may be replaced as is shown in Figure 3, by a beam of ultra-violet light, which is scanned over a target 60 formed from a scotophor having absorption characteristics as described above. The scotophor film 60 is preferably maintained in an evacuated envelope 61 as some materials (especially the SrS:Eu:Sm materials) deteriorate in normal atmospheres. Such a source of ultra-violet light scanning may be the light from a cathode-ray kinescope tube 56 having an ultra-violet light-emitting phosphor screen. Such a phosphor may be suitably prepared alumina or zinc oxide which emits a light in the blue and ultra-violet regions of the spectrum when excited by a cathode-ray beam. Signals applied to the control grid of the kinescope 56 will modulate the light emitted by the screen of the tube. The modulated light from tube 56 is focussed by a lens system 58 upon screen 60 to induce an absorption pattern in the phosphor material of screen 60.

Light from an infra-red source 62 is passed through an optical system 64 so that it strikes the scanned side of the scotophor screen 60. The scotophor material of screen 60 may be put down in such a thin layer that it is relatively transparent and will pass the unabsorbed portion of infra-red light from source 62. This unabsorbed portion is passed through a light filter 68 to an energy transducer 66 which changes the infra-red light from the screen 60 into visible light, as described above.

An absorption pattern may also be similarly induced in the scotophor 20 by a modulated X-ray beam scanned across the surface of the target or a source of positive ions, such as alpha particles, may be established within the tube envelope 14 (Figure 2), and scanned across the scotophor screen 20.

In Figure 3, the detector-tranducer 66 may be positioned alternately on the left side of the scotophor layer 60 in which there would be used the selective reflectivity of the scotophor screen which is modulated by the excited beam of the ultra-violet from the tube 56. This positioning of the transducer 66 would be similar to that shown in Figure 2 and in such a case the scanning source of ultra-violet 56 could be positioned eccentrically of the axis of the screen 60.

While certain specific embodiments have been illustrated and described, it will be understood that various changes and modifications may be made therein without departing from the spirit and scope of the invention.

What I claim is:

1. A combination for portraying signals, said combination comprising a scotophor material having an inducible absorption band in an invisible region of the electromagnetic spectrum, means for subjecting said scotophor material to an electromagnetic radiation having a wavelength lying within said absorption band, means inducing absorption in said phosphor in accordance with said signals, and means changing into visible light the electromagnetic radiations not absorbed by said scotophor.

2. A combination for portraying signals, said combination comprising an evacuated envelope, a scotophor screen within said envelope, the scotophor material of said screen having an inducible absorption band in the electromagnetic spectrum, a source of electromagnetic radiation having a wavelength lying within said absorption band, means for directing said electromagnetic radiation onto said scotophor screen, electron gun structure within said envelope for forming, directing and focussing an electron beam onto said scotophor screen, said electron gun structure including means for modulating said electron beam in accordance with said signals, means for scanning said modulated beam across said scotophor screen to induce an absorption pattern corresponding to the modulations of said beam, and means for changing into a visible light pattern the electromagnetic radiation not absorbed by said screen.

3. A combination for portraying signals, said combination comprising, a scotophor material having an inducible and eradicable absorption band in the invisible or near-visible regions of the electromagnetic spectrum, a source of electromagnetic radiation having a wave length lying within said absorption band, a second source of electromagnetic radiation of greater quantum energy than that of the radiation of the said first source for inducing absorption in said scotophor material, means for directing said electromagnetic radiations from said first and second sources onto said scotophor screen, and means for changing into visible light the electromagnetic radiations of said first source not absorbed by said scotophor.

4. A combination for portraying signals, said combination comprising, a scotophor material having an inducible and eradicable absorption band in the invisible or near-visible regions of the electromagnetic spectrum, a source of electromagnetic radiation having a wavelength lying within said absorption band, means for directing said electromagnetic radiation onto said scotophor screen, a second source of electromagnetic radiation of shorter wavelength than that of the radiation of said first source, said second source of radiation including a phosphor material for producing said radiation of shorter wave length than that of said first source, means for modulating the radiation from said phosphor material, means for directing said modulated radiation from said phosphor material onto said scotophor screen, means for scanning said modulated radiation across said scotophor screen to induce an absorption pattern corresponding to said modulated radiation, and means for changing into a visible light pattern the electromagnetic radiation from said first source not absorbed by said screen.

5. An electron discharge device comprising an evacuated envelope, an electron gun structure mounted within said envelope for forming an electron beam, a scotophor screen within said evacuated envelope, said screen formed from a scotophor material of strontium sulfo-selenide having an inducible and eradicable absorption band in the invisible and near-visible regions of the electromagnetic spectrum, said electron gun including means for modulating said electron beam, and means for scanning said electron beam across said scotophor screen to produce an absorption pattern corresponding to the modulations of said electron beam.

6. An electron discharge device comprising an envelope, a scotophor screen mounted within said envelope, said screen formed of a scotophor material of lithium fluoride having an inducible and eradicable absorption band in the invisible or near-visible regions of the electromagnetic spectrum, and means within said envelope for producing an absorption pattern in said screen material.

7. An electron discharge devise comprising an envelope, a scotophor screen mounted within said envelope, said screen formed of a scotophor material of sodium fluoride having an inducible and eradicable absorption band in the invisible or near-visible regions of the electromagneitc spectrum, means within said envelope for producing a modulated radiation, and means for scanning said modulated radiation over said scotophor screen to produce an absorption pattern in said scotophor material.

8. An electron discharge device comprising an envelope, a scotophor screen mounted within said envelope, said screen formed of a scotophor material of rubidium iodide having an inducible and eradicable absorption band in the invisible or near-visible regions of the electromagnetic spectrum, and means within said envelope for producing an absorption pattern in said screen material.

HUMBOLDT W. LEVERENZ.

REFERENCES CITED

The following references are of record in the file of this patent:

UNITED STATES PATENTS

| Number | Name | Date |
|---|---|---|
| 2,169,838 | Herbst | Aug. 15, 1939 |
| 2,277,009 | Von Ardenne | Mar. 17, 1942 |
| 2,402,762 | Leverenz | June 25, 1946 |
| 2,412,520 | Langmuir et al. | Dec. 10, 1946 |
| 2,418,780 | Leverenz | Apr. 8, 1947 |
| 2,445,774 | Gorn | July 27, 1948 |